Figure 1:
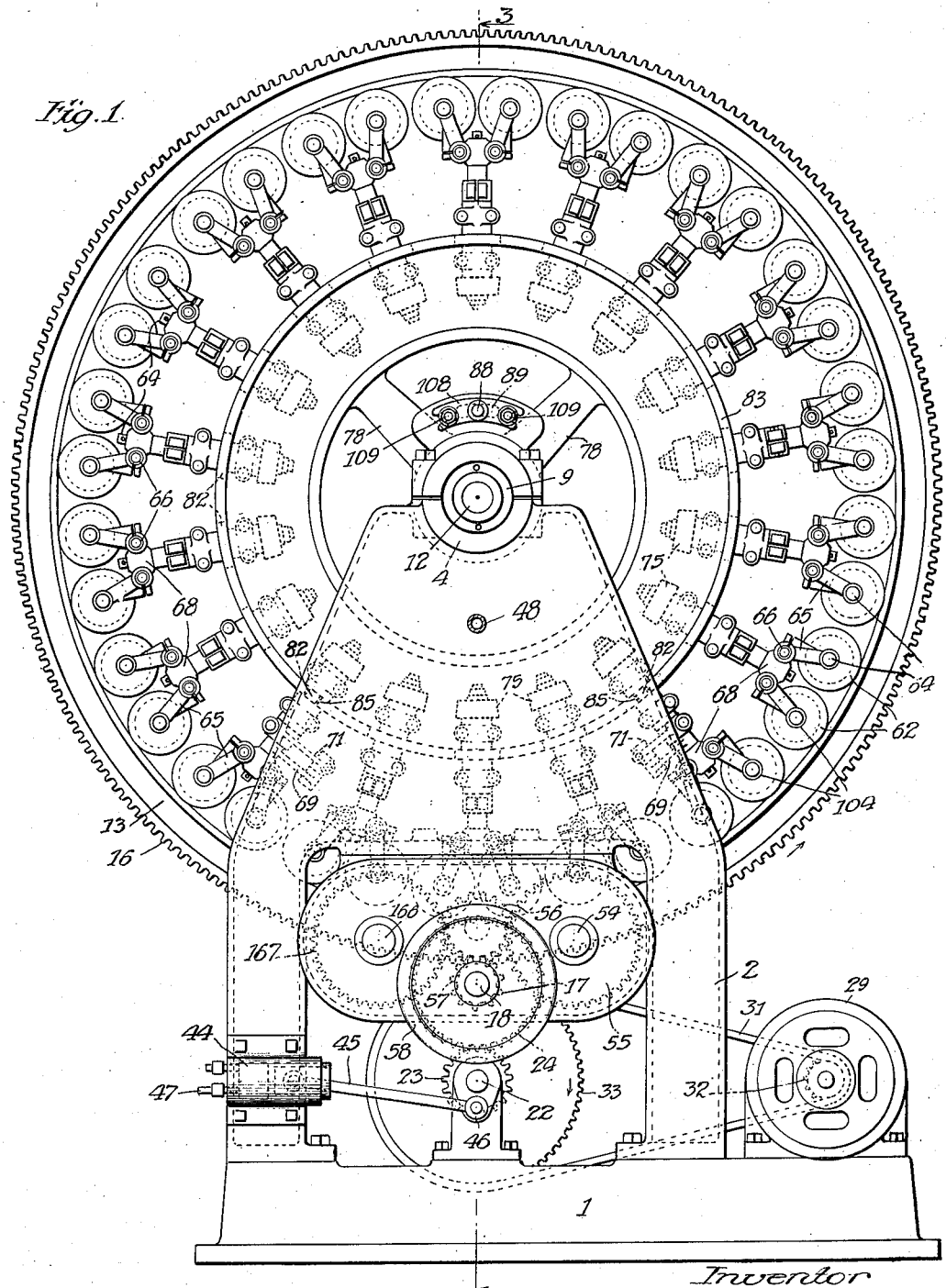

Sept. 3, 1935.  W. CAMERON  2,013,402

CAN BODY TESTING MACHINE

Filed Jan. 11, 1929    11 Sheets-Sheet 1

Sept. 3, 1935.    W. CAMERON    2,013,402
CAN BODY TESTING MACHINE
Filed Jan. 11, 1929    11 Sheets-Sheet 4

Fig. 4.

Witness
R. L. Davison

Inventor
William Cameron
By Ira J. Wilson
Atty.

Sept. 3, 1935.  W. CAMERON  2,013,402
CAN BODY TESTING MACHINE
Filed Jan. 11, 1929    11 Sheets-Sheet 5
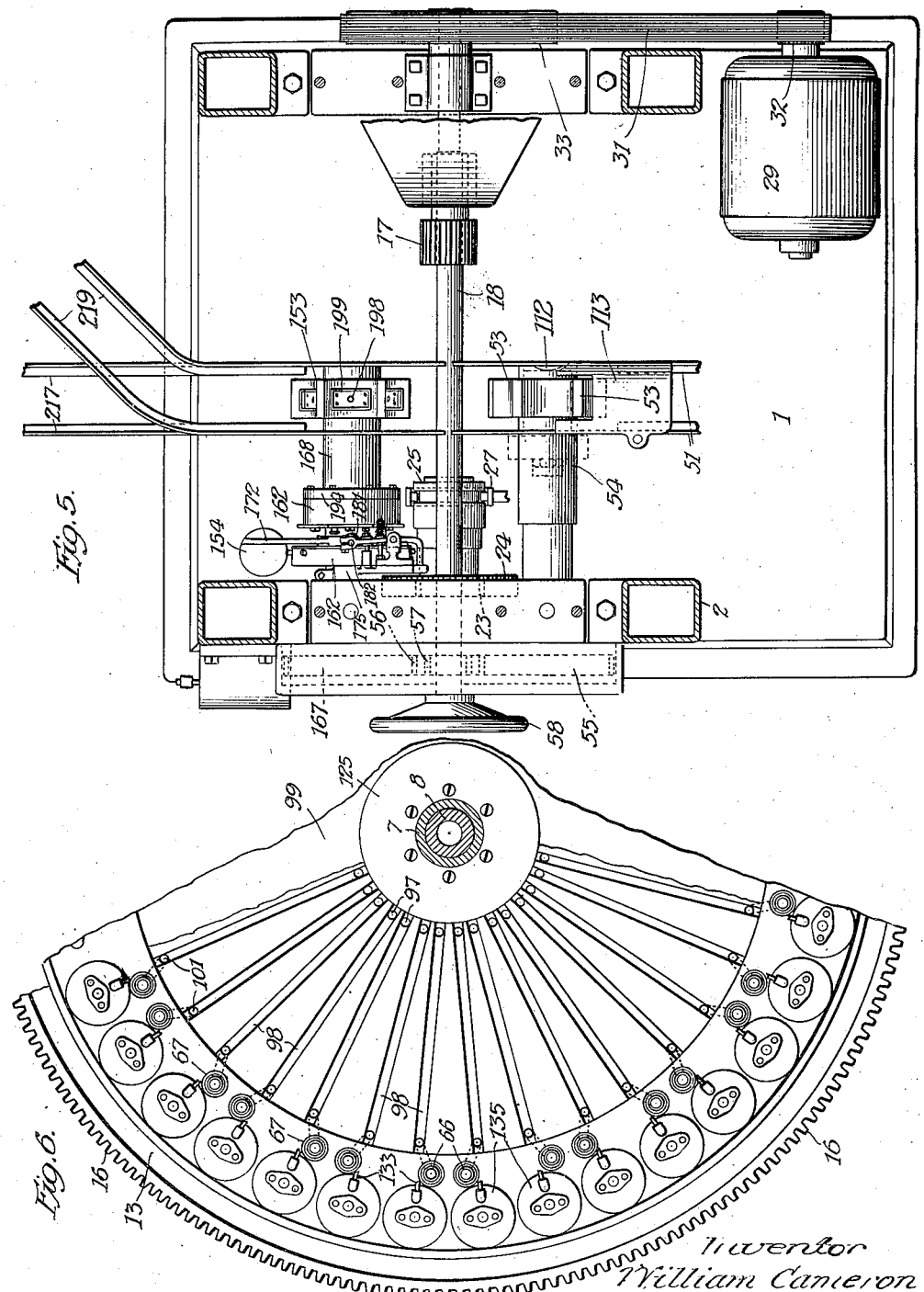

Sept. 3, 1935.  W. CAMERON  2,013,402
CAN BODY TESTING MACHINE
Filed Jan. 11, 1929  11 Sheets-Sheet 6

Witness
R. B. Davison.

Inventor
William Cameron.
By Ira J. Wilson
Atty.

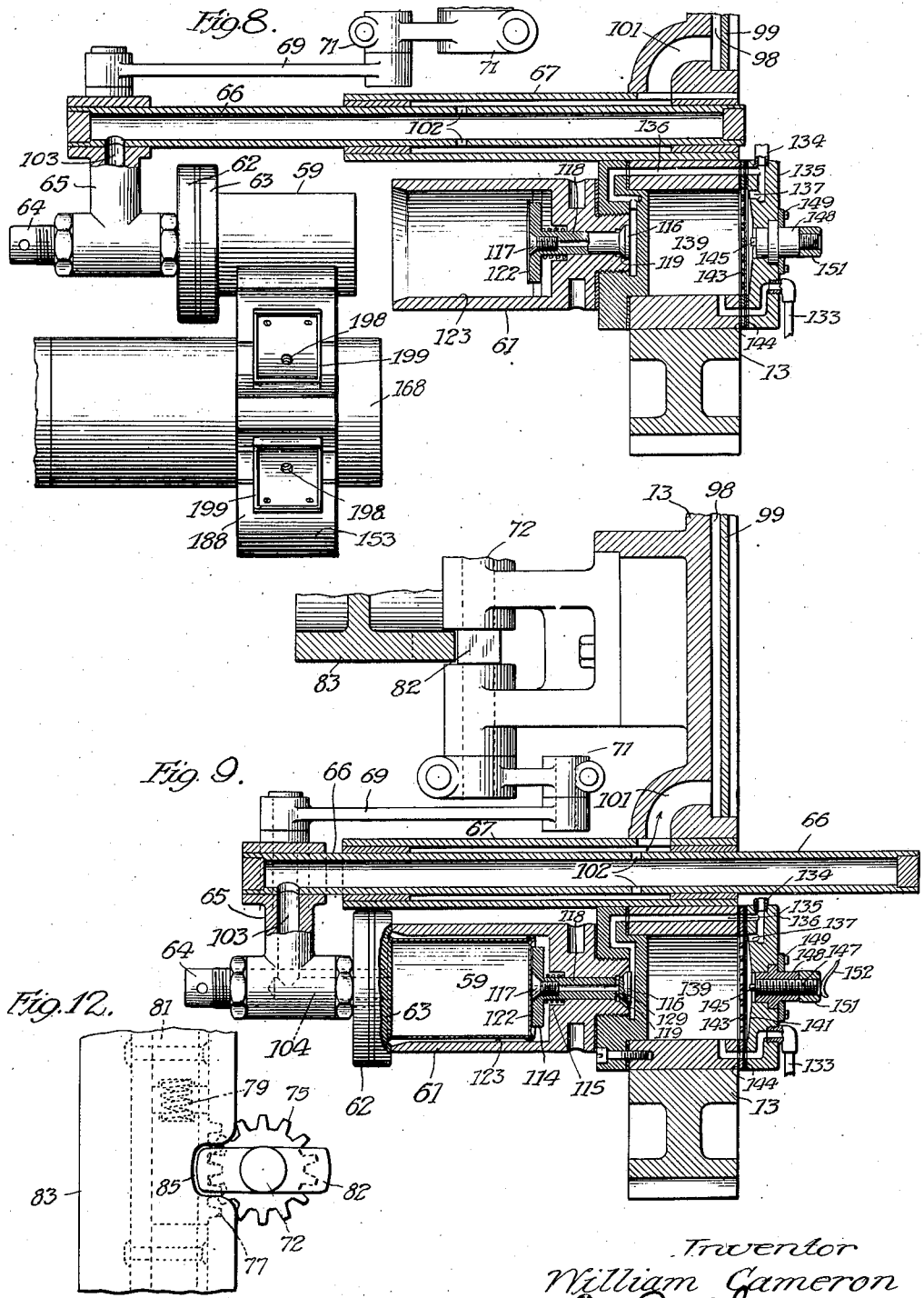

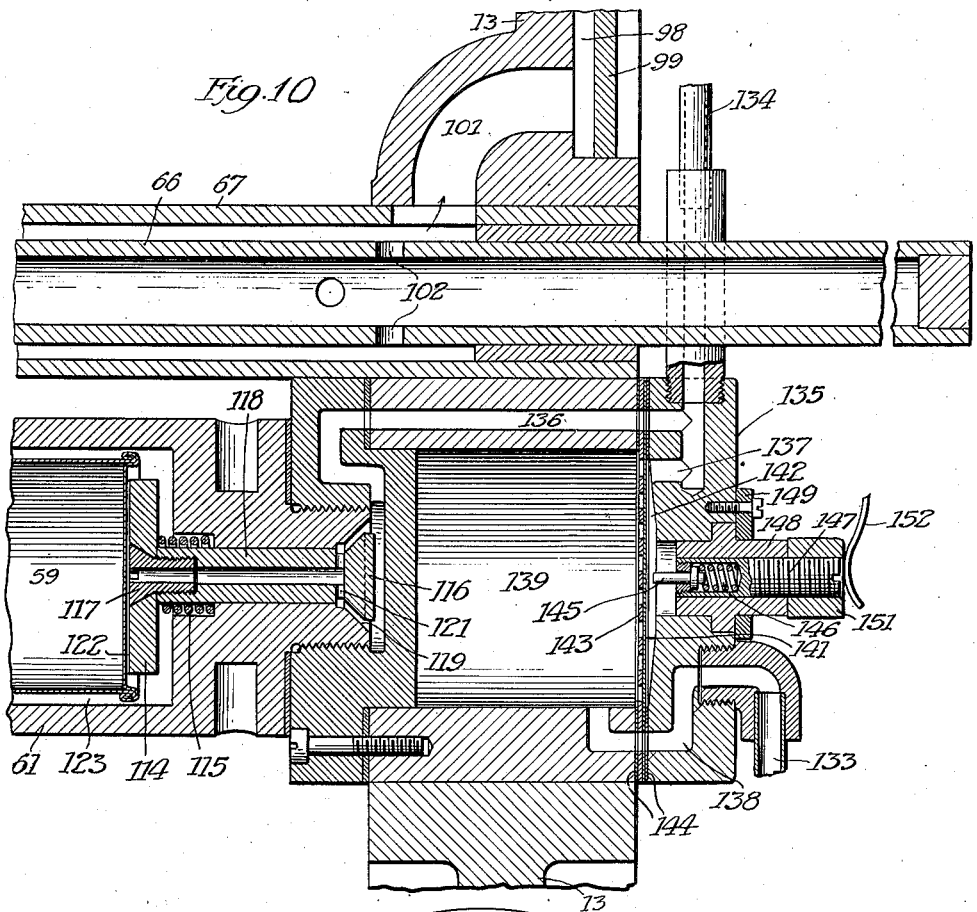
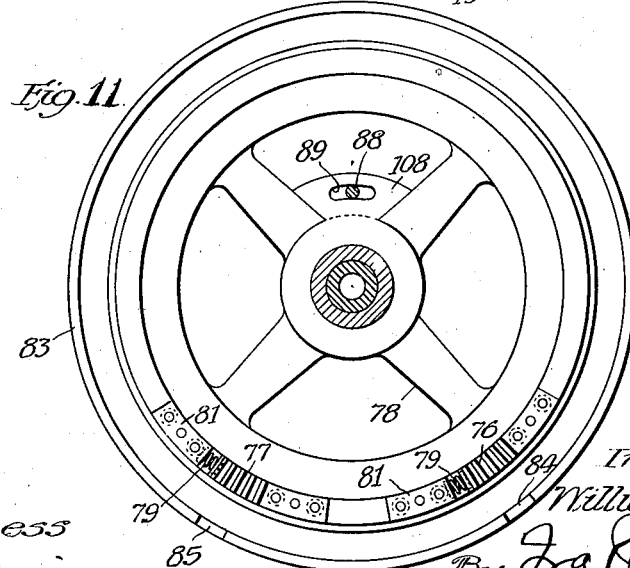

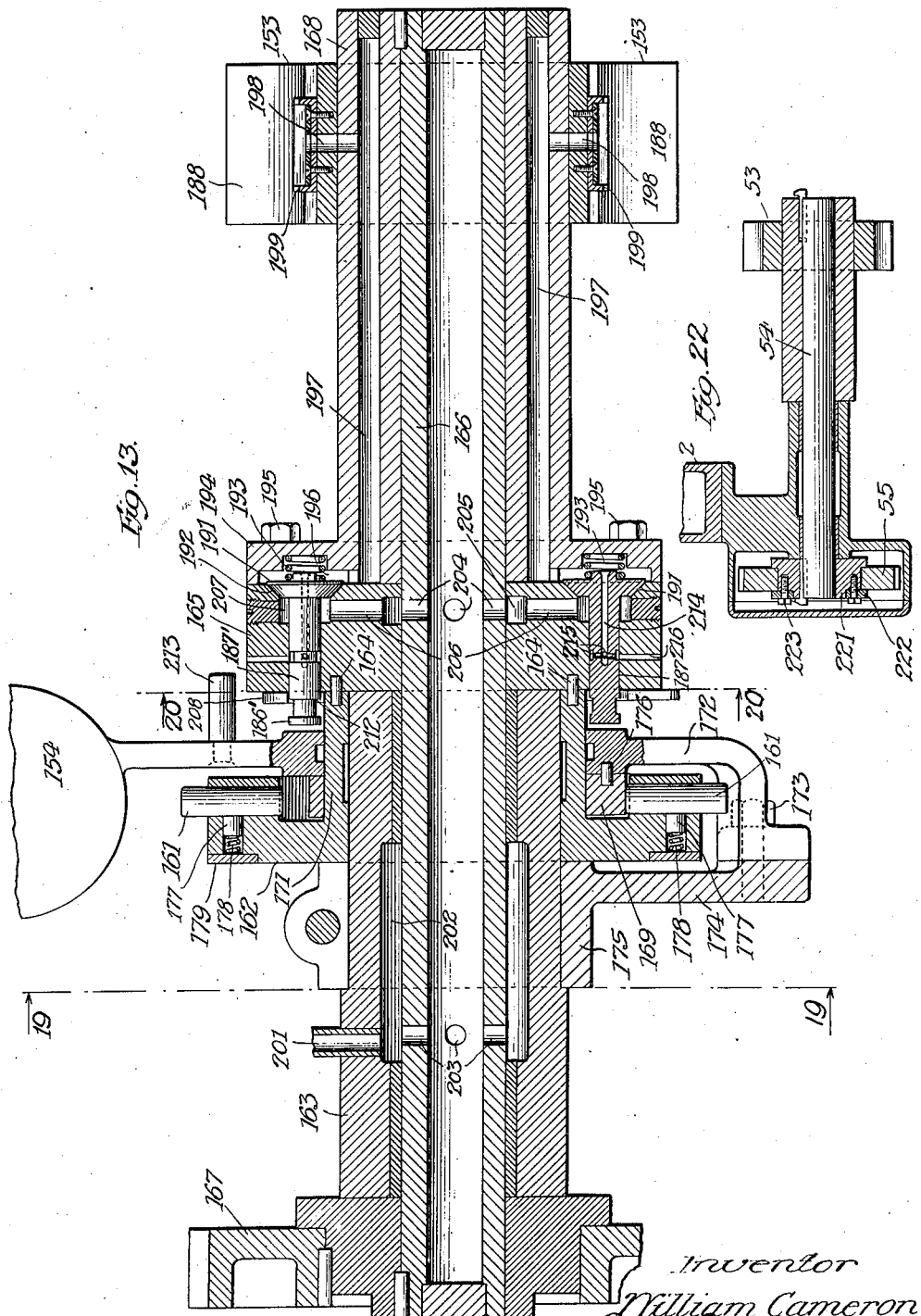

Sept. 3, 1935.  W. CAMERON  2,013,402
CAN BODY TESTING MACHINE
Filed Jan. 11, 1929    11 Sheets-Sheet 10
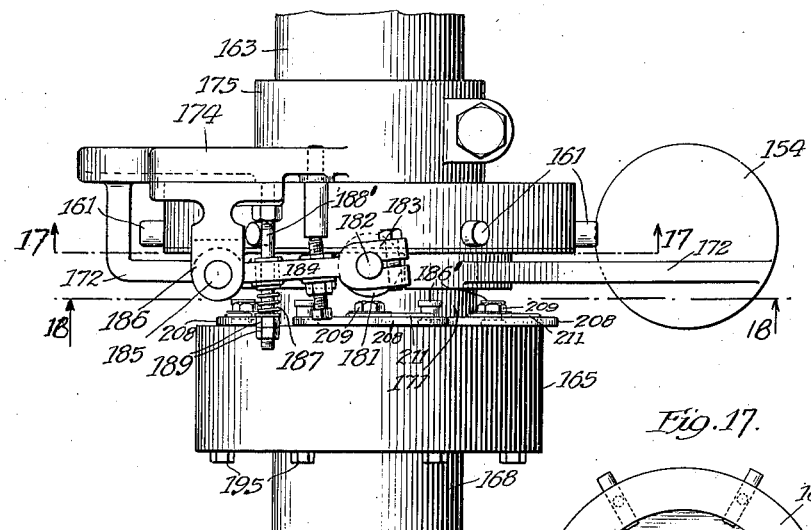
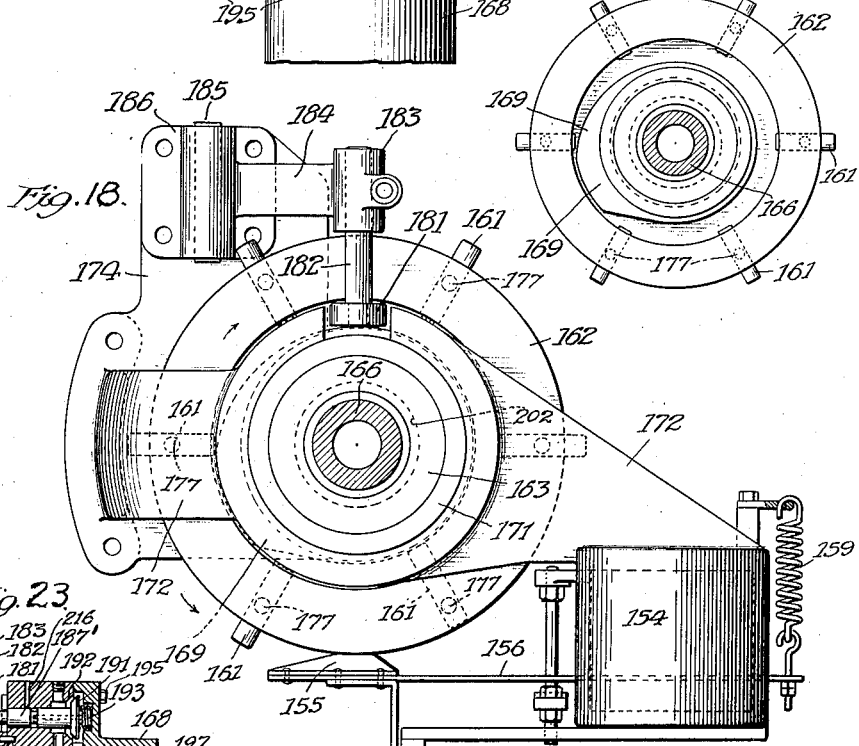
Inventor
William Cameron
By Ira J. Wilson
Atty.

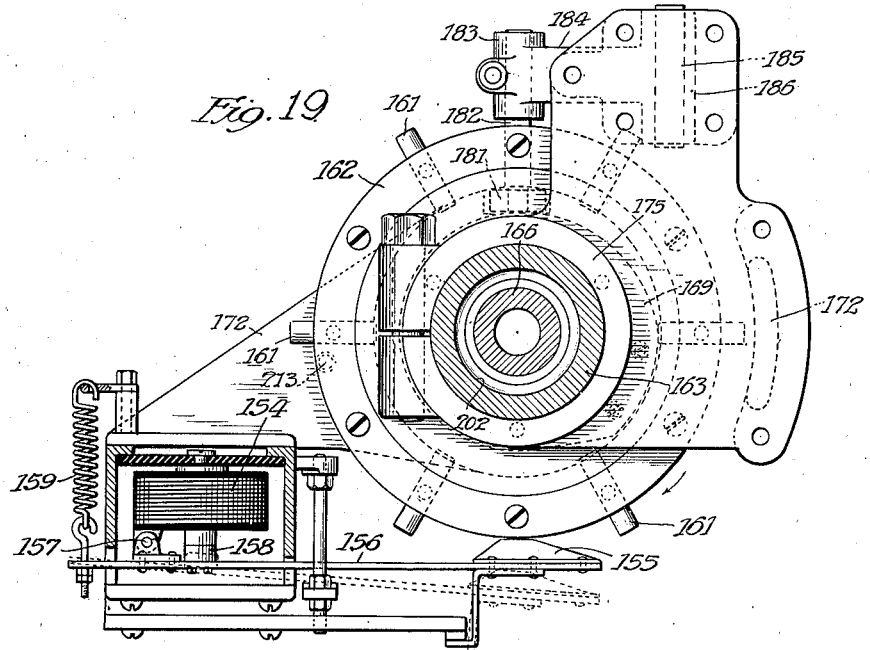
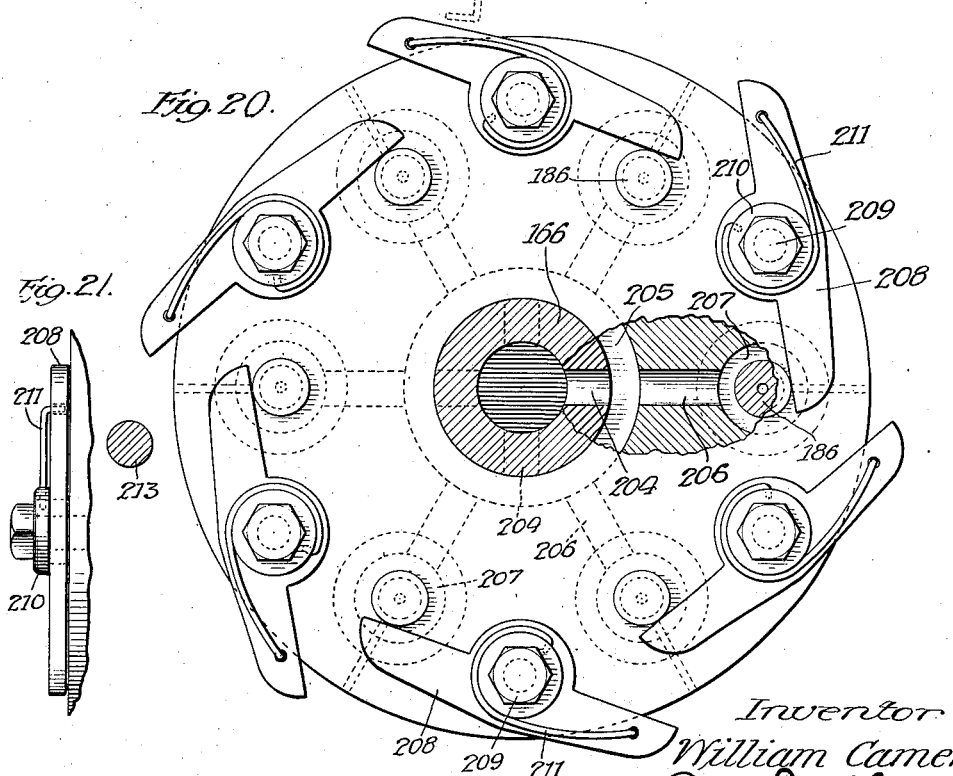

Patented Sept. 3, 1935

2,013,402

UNITED STATES PATENT OFFICE 2,013,402

CAN BODY TESTING MACHINE

William Cameron, Chicago, Ill., assignor to Cameron Can Machinery Co., Chicago, Ill., a corporation of Illinois Application January 11, 1929, Serial No. 331,845

30 Claims. (Cl. 73—51)

This invention relates in general to testing machines and the embodiment selected for illustrative purposes herein is particularly adapted for testing can bodies to determine whether or not the bodies are leak-proof.

Can bodies have heretofore been tested by applying either air pressure or a vacuum to the interior thereof, and the fall in pressure or vacuum as the case might be, resulting from a leaky body was utilized to actuate mechanism for separating the leaky body from the good bodies.

In testing can bodies by either of the methods just referred to, the production of a pressure or a vacuum in the bodies, sufficiently above or below atmospheric pressure to cause the selecting mechanism to operate as the result of a slight leak was not only expensive, but required an appreciable length of time for its production. Furthermore, the expense and the time increment increased proportionately with the increase in the size of the bodies being tested.

One of the primary purposes of my present invention is to eliminate the expense of producing a high pressure or a high vacuum on the inside of the can bodies as well as the time increment involved in producing high pressures or vacuums, particularly in large bodies, and thereby to minimize the cost of testing and to very materially increase the testing speed.

Another object is to insure maximum accuracy in testing so that the slightest leak will be readily detected and the defective body will be separated from the perfect bodies.

It being obvious that the larger the volume of the inclosed space to which the pressure or vacuum is applied the longer time will be required to materially reduce such pressure or vacuum through a small leak in a body, my invention contemplates the elimination of this factor and the reduction of the space or volume subjected to the pressure differential to a minimum by introducing the bodies to be tested into correspondingly shaped receptacles of only slightly larger volume than the bodies, and applying the pressure to the restricted space within the receptacle around the outside of the body. The volume of this space is relatively quite small in comparison with the volume of the body itself; consequently much less air is required to establish a pressure differential within this space than would be required to establish the same differential within the body itself and a correspondingly less time will be required to produce a predetermined pressure reduction through a leak opening of a small size.

In order to establish the requisite pressure differential without the necessity of the employment of high air pressures, my invention further contemplates the production of a pressure surrounding the body to be tested, and the simultaneous production of a partial vacuum within the body, with the result that neither a high pressure nor a high vacuum are required to establish the desired differential pressure between the inside and the outside of the body.

Another feature of my invention resides in the fact that the small volume of the space subjected to pressure around the can body being tested enables a small leak to be quickly and accurately detected, because a small leak from a small space under pressure will quickly result in a reduction of the pressure sufficient to set in operation the mechanism for selecting and separating the leaky can from the others, whereas the same leak from a large space under pressure would not in the same length of time result in a corresponding decrease in pressure. The time required for testing each body is therefore materially reduced, enabling the speed of the machine to be correspondingly increased.

Other objects of my invention are the production of a testing machine which can be manufactured at a reasonable cost, one which will be accurate and reliable as well as durable in operation, one which will accurately test can bodies at an extremely high speed and which can be operated at a relatively low cost.

Other objects and many of the inherent advantages of my invention will be readily appreciated as the same becomes better understood by reference to the following description when considered in connection with the accompanying drawings.

Figure 2:
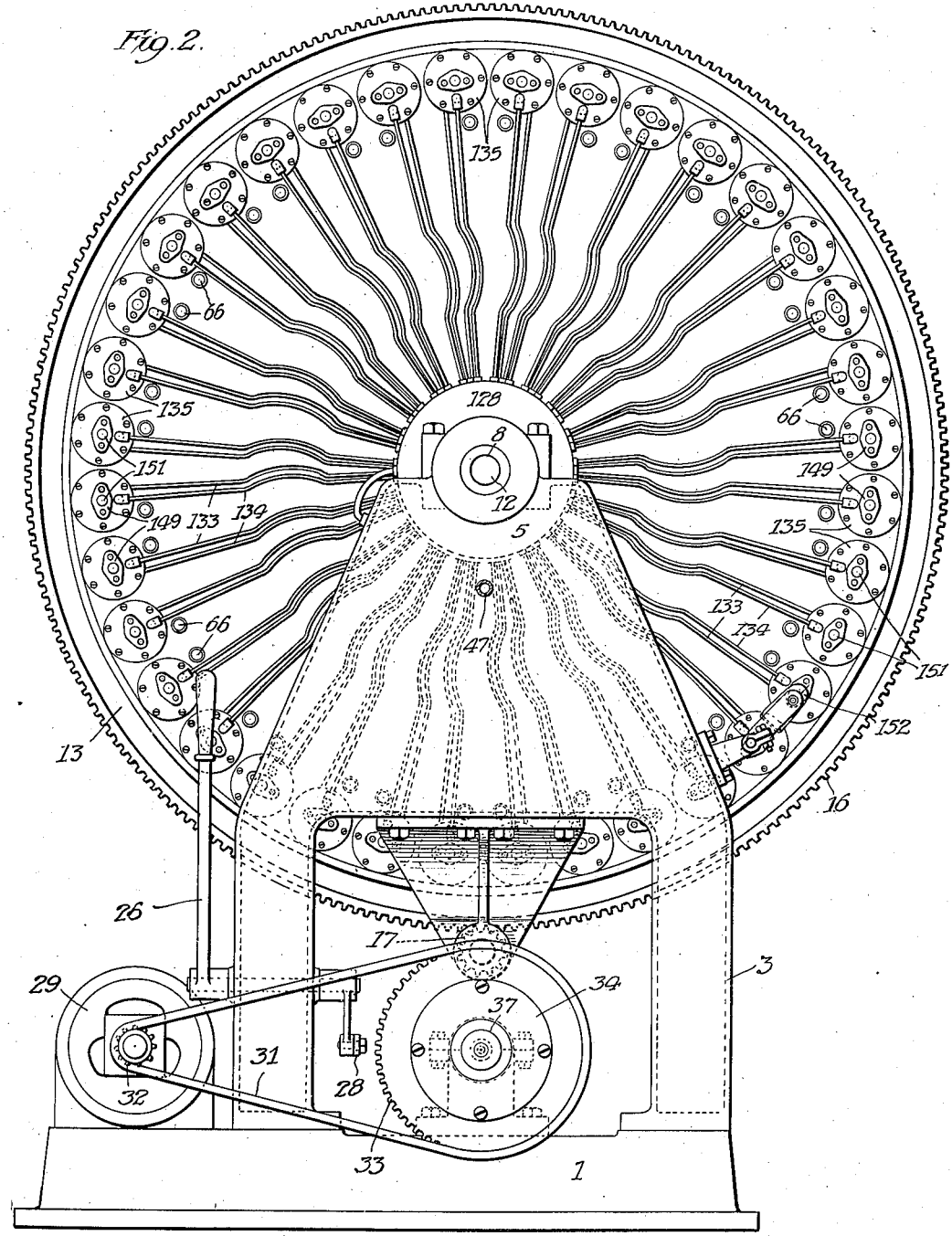
Figure 3:
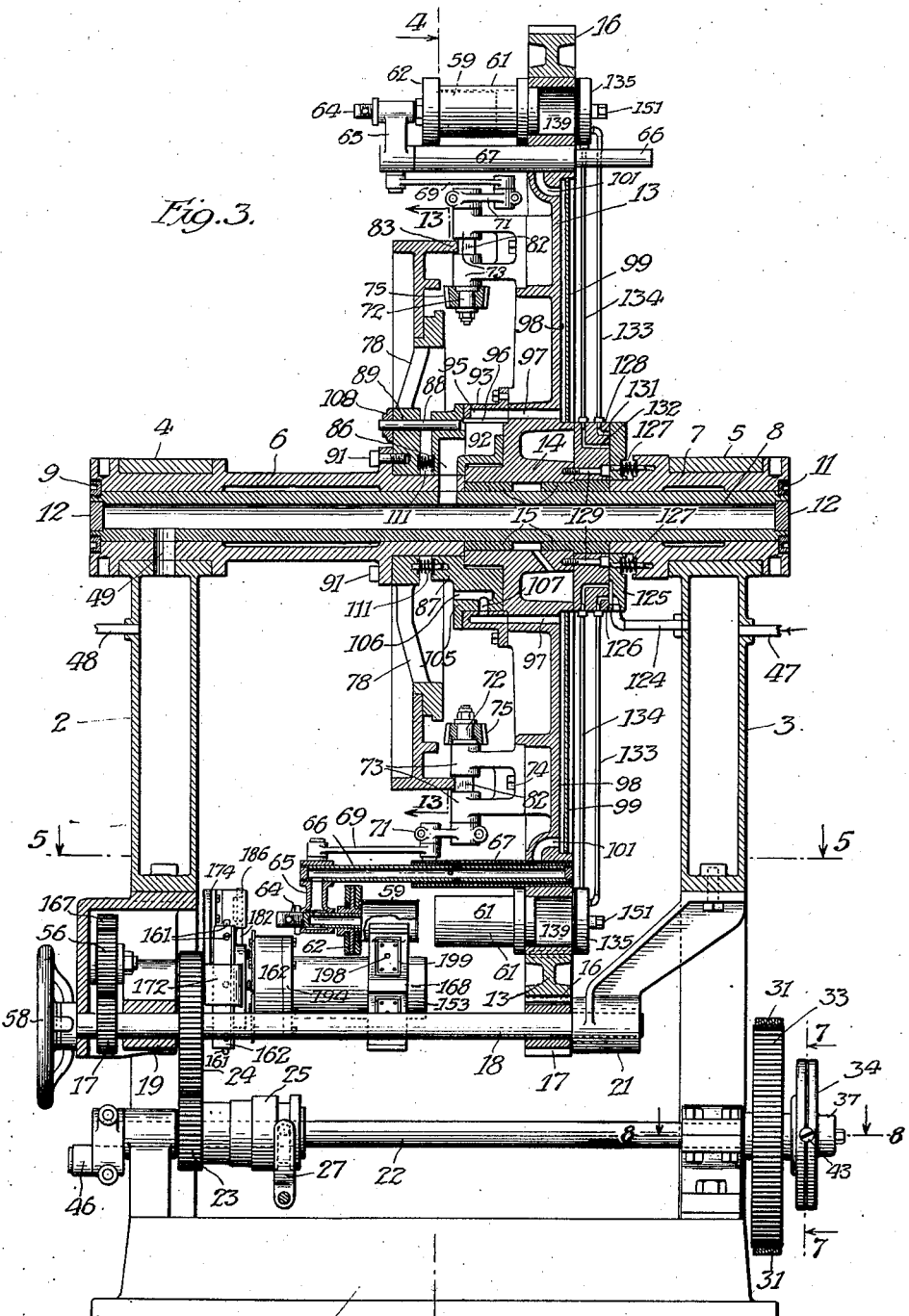
Figure 7:
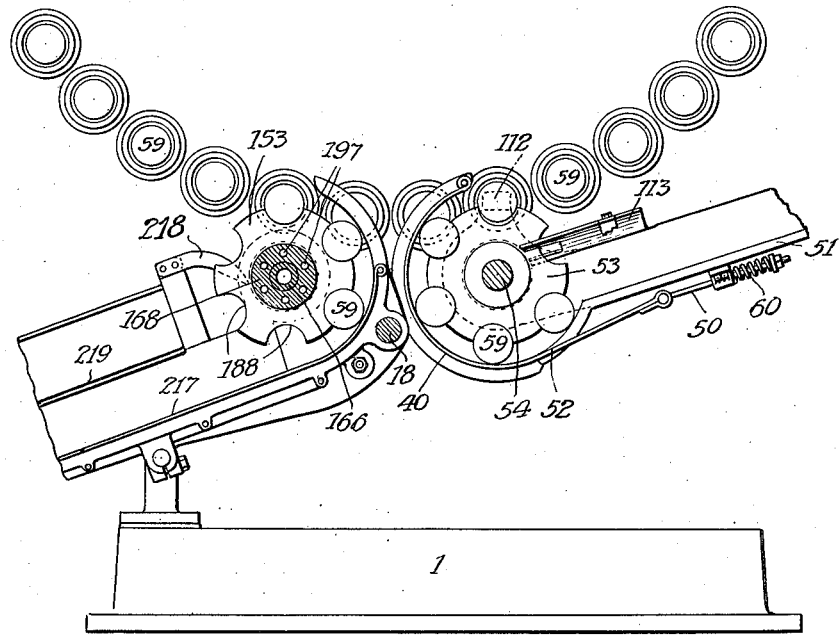
Figure 14:
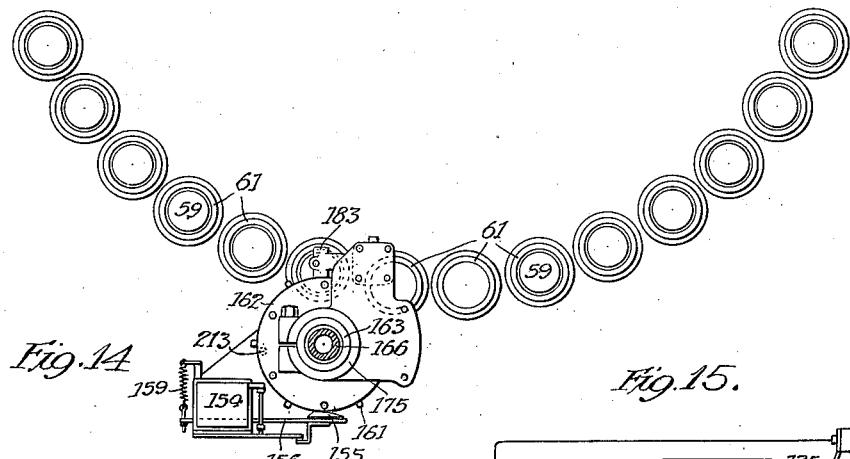
Figure 15:
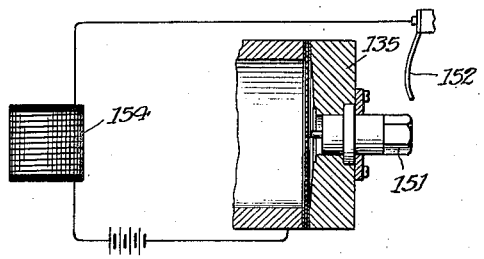

Referring to the drawings:

Fig. 1 is a side elevation looking toward the right in Fig. 3 of a machine embodying my invention, Fig. 2 is a side elevation looking toward the opposite side of the machine, Fig. 3 is a transverse sectional view taken on the line 3—3 of Fig. 1, Fig. 4 is a longitudinal sectional view substantially on the line 4—4 of Fig. 3, Fig. 5 is a horizontal sectional view taken substantially on the line 5—5 of Fig. 3, the carrier and mechanism carried thereby being omitted, Fig. 6 is a fragmentary view of the rear face of the carrier partially broken away to show the air passages in the web of the turret, Fig. 7 is a somewhat diagrammatical elevation of the can body feeding and delivery mechanisms, Fig. 8 is an enlarged fragmentary sectional view of one of the can body carrying mechanisms mounted on the carrier, the can body being shown as withdrawn from its receiver, Fig. 9 is a similar view showing the can body positioned in its receiver, Fig. 10 is an enlarged fragmentary sectional view showing more in detail one of the pressure operated controlling mechanisms, Fig. 11 is a small face view of the stationary cam and gear segments which control the positions of the can body feed heads, taken substantially on the line 13—13 of Fig. 3, Fig. 12 (Sheet 8) is a fragmentary detail view of one of the gear segments and a cooperating pinion, Fig. 13 is a horizontal sectional view of the delivery turret head and the selector mechanism associated therewith, Fig. 14 (Sheet 7) is an end elevation of a portion of the can selector mechanism, Fig. 15 is a diagrammatic view showing the selector circuit, Fig. 16 is a fragmentary plan view of the selector mechanism, Fig. 17 is a sectional view on the line 19—19 of Fig. 16, Fig. 18 is a similar view taken on the line 20—20 of Fig. 16, Fig. 19 is a sectional view on the line 21—21 of Fig. 13, Fig. 20 is a sectional view on the line 22—22 of Fig. 13, Fig. 21 is an edge view of one of the selector valve latches shown in Fig. 20, Fig. 22 (Sheet 10) is a fragmentary sectional view of the feed turret head and driving mechanism therefor, and Fig. 23 is a fragmentary sectional view showing a selector valve stem, the actuating roller therefor, and a control pin in cooperative relation.

Referring now to the drawings more in detail, it will be observed that the machine comprises a base 1, on opposite sides of which are mounted a pair of upright standards or frame members 2 and 3 respectively, provided at their respective upper ends with bearings 4 and 5. The bearing 4 carries a stationary tubular sleeve 6 and the bearing 5 carries a stationary sleeve 7, both sleeves being rigidly connected together by a central hollow shaft 8 having clamping nuts 9 and 11 respectively threaded upon its opposite ends, as shown in Fig. 3. The ends of the shaft 8 are closed by suitable plugs 12.

A rotatable carrier in the form of a large disc wheel, indicated generally by reference character 13, is rotatably mounted upon the shaft 8 intermediate its ends, the hub 14 of the carrier, as will be apparent from Fig. 3, being journalled upon bearing sleeves 15 surrounding the shaft 8. The carrier has fixedly mounted upon its perimeter a large ring gear 16 by which rotation is imparted to the carrier from a pinion 17 fixed upon a countershaft 18 journalled in bearings 19 and 21 supported on the standards 2 and 3 respectively.

The countershaft 18 is driven from the main drive shaft 22 of the machine through a pair of gears 23 and 24, the gear 23 being clutched to the drive shaft by a clutch 25 of any suitable construction, adapted to be actuated by one or more conveniently positioned hand levers 26 connected to the clutch yoke 27 by a link 28, as will be apparent from Figs. 2 and 3.

Power is applied to the drive shaft 22 from an electric motor 29 through a sprocket chain 31 engaging the sprocket pinion 32 on the motor shaft and a driven sprocket wheel 33, loosely mounted on the drive shaft 22 and connected to this shaft through the intermediary of a safety clutch 34 adapted to slip under excessive load.

An air compressor 44 (Fig. 1) mounted upon the side of the machine is driven through a connecting rod 45 from a crank 46 fixed on the shaft 22. The delivery side of the compressor discharges through a pipe or hose 47 (Figs. 1 and 3) to the hollow standard 3 which serves as the compressed air storage chamber. A vacuum pump (not shown) induces through the pipe 48 a partial vacuum upon the interior of the standard 2 from which the transmitted vacuum is drawn through the port 49 to the interior of the hollow shaft 8.

The can bodies are delivered to the machine by gravity down an inclined chute 51 (Figs. 4 and 7) the lower end 52 of which is formed semi-circular concentric with the star-shaped feeding turret 53 mounted upon the rear end of the shaft 54 (Figs. 4, 5, and 7). This shaft is driven from a gear wheel 55 fixed upon the outer end thereof which in turn meshes with and is driven by a pinion 56 meshing with and driven by a pinion 57 upon the outer end of the countershaft 18. A hand wheel 58 upon this shaft provides means whereby the machine may be turned over by hand.

The can bodies 59 are elevated in separated relation by the feeding turret 53 into alignment with the successive chuck heads mounted upon the carrier wheel by which they are inserted into and withdrawn from their respective testing receptacles, as will be explained more in detail hereafter.

The carrier wheel is equipped near its perimeter with a series of, in the present instance, thirty-six testing receptacles 61, each of slightly greater diameter than the can body 59 which it is designed to accommodate.

Cooperating with each testing receptacle is a reciprocatory chuck 62 provided with a sealing face 63 of rubber or other similar material adapted to effect an hermetic seal with the edges of the open end of the can body. Each chuck is carried by a hollow stem 64 fixedly mounted on a hollow head 65 in turn carried by a hollow rod 66 mounted for reciprocatory movement in an elongated tubular guide member 67, fixed to the carrier wheel radially inwardly from each testing receptacle 61. The chucks 62 and the movable supporting means therefor are connected together in pairs by a cross head 68 which is reciprocated by a connecting rod 69 attached at its inner end to a crank 71 fixed upon the outer end of a short shaft 72 journalled in spaced bearings 73 fixedly secured by bolts 74 to the web of the carrier wheel. Each shaft is provided at its inner end with a pinion 75 adapted to mesh at spaced intervals, as shown in Figs. 11 and 12 with segmental racks 76 and 77, to impart a half revolution to the shafts 72 as the shafts are moved by the carrier wheel past the respective racks carried by the stationary spider 78. Each of the racks 76 and 77 is slidably mounted on the spider and a buffer spring 79 is interposed between one end of the rack and a fixed abutment member 81 to form a yielding cushion for the rack which absorbs the shock as the pinion impacts the first tooth at the opposite end of the rack.

Each shaft 72 has also fixedly mounted thereon an elongated cam follower 82 (Figs. 3 and 12) which, by engagement with the opposed face of the projecting peripheral flange 83 of the spider 78, holds the shaft 72 against rotation during the travel of these shafts along the spider except at the times when a half-revolution is imparted to the shafts by the racks 76 and 77, and this rotative movement of the shafts is permitted by the depressions 84 and 85 respectively in the flange 83, into each of which an end of the follower 82 enters, as shown in Fig. 12, while the shaft is making its half revolution. The semi-revolution of the shaft 72 imparted thereto by the rack 77 is adapted to move the chuck heads 62 as they successively pass the rack from the outer position shown in Fig. 8 to the inner position shown in Fig. 9 and similarly the rack 77 moves the chuck heads in succession from the position shown in Fig. 9 to that shown in Fig. 8 to withdraw the can bodies 59 from their respective testing receptacles 61.

Vacuum is applied to the can bodies whereby they are held against and in sealed relation to their respective chucks and a partial vacuum is induced in each can body by suction from the vacuum pump which is imposed upon the respective can bodies through the following channels. Referring particularly to Fig. 3, it has previously been explained that vacuum is induced in the hollow shaft 8 through port 49. This vacuum is transmitted through a radial passage 86 formed through the shaft 8, the surrounding sleeve 6 and the cup-shaped member 87 held against rotation by a pin 88 projecting through an arcuate slot 89 in the spider 78 which is fixed to the stationary shaft by bolts 91. The channel 86 communicates with an annular vacuum chamber 92 formed in the cup-shaped member 87, as shown in Fig. 3. A ring 93 is secured by bolts 94 to the web of the carrier so as to rotate therewith, and is provided with a series of passages 95 corresponding in number and position with the chuck heads, and each communicating with the vacuum chamber 92 through a slot 96 as shown in Figs. 3 and 4. Each passage 95 is in communication with a corresponding passage 97 through the hub 14 of the carrier wheel, and each of these passages communicates at its outer end with a radial passage 98 formed on the inner face of a large plate or disc 99 fixedly secured by bolts or otherwise against the rear machined face of the wheel web 13. The outer end of each of the radial passages 98 communicates through a branch passage 101 formed in the carrier wheel with the interior of the tubular guide member 67 through ports 102. Communication is established with the interior of the hollow reciprocatory rod 66 from whence through a passage 103 in the head 65 and communicating longitudinal passage 104 in the hollow member 64 communication is established through the chuck head 63 with the interior of the can body 59. When, therefore, a can body is brought into engagement with a chuck head, the suction applied thereto will hold the body against the face of the head and will induce a partial vacuum throughout the greater portion of a revolution of the carrier until the vacuum is broken by establishing communication between the interior of the body and atmosphere, as will now be explained.

Referring to Figs. 3 and 4, it will be observed that the cup-shaped member 87 is divided near its bottom by a radial web 105 provided with a passage 106 opening to atmosphere and a radial port 107 flared at its lower end as shown in Fig. 4 and adapted to communicate with the slots 96 in the ring 93 as they are successively passed into registration therewith. It follows, therefore, that vacuum from the chamber 92 is applied through each chuck head to the can body in sealed relation therewith from the time the slot 96 first communicates with the chamber 92 after passing the web 105 until the carrier makes practically a complete revolution and the slot is brought into communication with atmosphere through the port 107. The breaking of the vacuum on each chuck head for a limited period is utilized for the removal of the can body from the chuck head, and as soon as another body is brought into engagement therewith, the vacuum is again applied to maintain the sealed relation between the can body and the head and to also enable the head to withdraw the body from its testing receptacle after the testing of the body has been completed.

The position of the cup-shaped member 87 may be angularly adjusted about the hollow shaft to regulate the timing of the vacuum cut-off by angularly adjusting the plate 108 secured to the outer end of the pin 88. The arcuate slot 89 through which the pin projects, permits of such adjustment and the parts are locked in adjusted position by a plurality of clamping bolts 109.

A hermetic joint between the member 87 and the opposed face of the ring 93 is maintained by a plurality of expansion springs 111 interposed between the outer face of the member 87 and the opposed inner face of the hub of the spider 78, as will be apparent from Fig. 3.

When the incoming can bodies 59 reach the curved lower end of the chute 51, they are spaced by the feed turret head 53 as shown in Figs. 4 and 5 and enter the successive sockets in the head by which they are carried upwardly into alignment with successive chuck heads 62 on the carrier wheel. To assure the entrance of the bodies into their respective sockets in the feed turret 53 and at the same time to preclude injury to the bodies by jamming, the bodies are urged into their sockets by a flexible metal strap 40 (Fig. 7) secured at one end to the upper extremity of the feed chute and attached at its other end to a rod 50 which is urged toward the right viewing Fig. 7 by a coiled expansion spring 60 so as to maintain a yielding tension on the strap 40.

The chuck heads 62, as they approach the feed turret, have been moved into the outer position shown in Fig. 8 by the rack 76 acting upon the successive pinions 75 as they pass the rack in the manner previously explained. As each can body is brought by the feed turret into longitudinal alignment with its respective chuck head, the body is moved longitudinally toward and into engagement with the head by a cam shaped plate 112 mounted at the right hand side, viewing Fig. 5, of the feed turret head 53. Approximately at the time the open end of the body is pushed against the opposed face of the chuck head, the particular groove 96 in the ring member 93 which is in communication with that chuck head, passes the cut-off web 105 and communicates with the vacuum chamber 92 so that vacuum is applied to that particular chuck head and to the interior of the can body engaging therewith to hold the can against the head. The body therefore is at this point attached to its chuck head by suction and is carried forwardly and upwardly by the head away from the feed turret and in alignment with its respective testing receptacle. If for any reason a body should fail to become attached to its head, it will drop upon an inclined plate 113 (Figs. 7 and 5) by which it will be deflected away from the operating parts of the machine into a basket or other receptacle placed to receive it.

As the carrier wheel continues its rotation, the can bodies are successively attached to their respective chuck heads in the manner explained, and when a pinion reaches the stationary segmental rack 77, a half-revolution is imparted to the shaft 72 to thereby, through its crank 71 and link 69, move the two heads connected therewith simultaneously toward their respective testing receptacles 61 to thereby simultaneously introduce two can bodies into their testing receptacles. A hermetic seal between the chuck head and the can body has already been established, as previously explained, and the movement of the head toward its receptacle is such that the head is also forced against the open end of the receptacle to establish a hermetic seal also between the edges of the receptacle and the rubber face 63 of the head. In order to insure the establishment of this seal between the receptacle and the head, irrespective of whether or not all of the can bodies are exactly the same length, a false bottom or plate 114 is disposed in the bottom of each receptacle 61 which is adapted to yield as the bottom of the can body is forced against it by reason of the fact that the false bottom is urged away from the bottom of the receptacle by a coiled expansion spring 115, (Figs. 8, 9, and 10).

The false bottom serves also as a controlling device for opening a valve 116 to admit air under pressure into the receptacle 61 around the can body. To this end the false bottom 114 is secured by a hollow screw 117 to one end of a hollow valve stem 118 upon the other end of which is mounted the valve 116. This valve is adapted to seat against a valve seat 119 formed in the carrying base of the receptacle 61. The stem of the valve immediately beneath the valve proper is radially slotted as indicated at 121 so that communication is established between the interior of the stem and the space around the valve when the valve is open and the fastening screw 117, as well as the false bottom plate 114 are radially grooved, as indicated at 122 to permit the flow of air under pressure from the valve stem into the pressure space 123 around the can body.

Air pressure from the storage chamber in the standard 3 which has been delivered thereto by the compressor through the pipe 47, as previously explained, is delivered to all of the testing receptacles and their cooperating control devices in a manner which will now be explained, particular reference being had to Figs. 3 and 8 to 10 inclusive.

From the pressure chamber in the standard 3 the air under pressure is conducted through a pipe 124 to a supply and cut-off valve disc 125 provided with a supply recess or port 126 in communication with the pipe 124. This disc, which is non-rotatably mounted upon the inner end of the sleeve 7, is urged by a plurality of expansion springs 127 against the opposed face of a cooperating disc 128 attached by bolts 129 to the hub 14 of the carrier so as to rotate therewith. The disc 128 is provided with a series of angular passages 131 and 132, the receiving end of each of which is closed by the opposed face of the disc 125 except when opposite the recess 126 through which air is supplied to these passages 131 and 132. The opposite ends of passages 131 and 132 communicate respectively with the small radially disposed pipes or conduits 133 and 134 leading to the control casings 135 near the perimeter of the carrier. The conduit 134 communicates through a suitable passage 136 formed in the wall of the casing 135 with the space at the outer end of the valve 116 and also, to a passage 137 with the interior of the casing at the outer end thereof. Conduit 133 communicates through a suitable passage 138 with the pressure chamber 139 inside the casing.

The space within each casing 135 is divided by a flexible preferably thin metal diaphragm 141 into the pressure chamber 139 and the smaller pressure chamber 142, and normally the pressures in these chambers on both sides of the diaphragm 141 entering from the conduits 134 and 133 are equal. To prevent undue flexure and possible permanent distortion of the diaphragm 141, should the pressure in chamber 142 accidentally exceed that in 139, a perforated plate 143 is disposed against the inner face of the diaphragm, as best shown in Fig. 10. The head in each casing 135, which is recessed on its inner face to provide the chamber 142, is secured to the body of the casing by a plurality of bolts (not shown) passing through the head and threaded into tapped holes in the body. Gaskets 144 are disposed on opposite sides of the plate and diaphragm to insure against leakage at the joint.

The machine is so timed that a can body is fully introduced into its testing receptacle to open its valve 116 immediately prior to alignment of its passages 131 and 132 with the air supply recess 126 in the valve disc 125. When therefore, these passages come into registration with the supply recess or port 126, air under pressure is admitted through the passage 136 and valve stem 118 into the pressure space 123 around the can body, through the passage 137 into the pressure chamber 142 outside the diaphragm 141 and through the passage 138 into the central pressure chamber 139 at the inner face of diaphragm 141. All of these chambers 123, 139 and 142 therefore are under the same air pressure. As the rotation of the carrier moves the passages 131 and 132 out of registration with the supply port 126, the outer ends of these passages are sealed during further revolution of the carrier by the opposed face of the valve disc 125 so that the pressure in the three chambers, 123, 139 and 142 is maintained unless a leaky can body be disposed in the testing chamber, in which event the pressure will leak through to the interior of the body, thereby reducing the pressure in chambers 123 and 142 to set in operation the selector mechanism which will now be described.

Since chamber 139 is not in communication with chambers 123 and 142, a reduction in pressure in the latter two chambers as the result of a leaky can body will cause the diaphragm 141 to flex toward the right, viewing Fig. 10, under the influence of the pressure in chamber 139 which is then greater than the pressure in chamber 142. This flexure of the diaphragm causes it to contact with the end of a contact pin 145 yieldingly projected by a coiled spring 146 from an adjustable contact post 147 adjustably mounted in an insulating sleeve 148 secured to the head of the casing 135 by a holding ring 149. A lock nut 151 holds the adjustable post 147 in adjusted position. Contact of the disc 141 with the pin 145 serves to close an electric circuit which sets in operation the selector mechanism by which the leaky can body is selected and later in the cycle of the machine separated from the good bodies and delivered from the machine through an independent faulty can delivery chute.

The selector mechanism by which the leaky bodies are selected and independently delivered is best illustrated in Figs. 13 to 23 inclusive. Referring first for a moment to Figs. 2, 10 and 15, it will be observed that a contact wiper 152 is mounted in position to be contacted by the end of the contact post 147 at one point in the revolution of the carrier, the wiper being located so that this contact is established just before or approximately at the time a body enters a socket of the delivery turret 153 (Figs. 4, 5, and 7) by which the bodies are delivered. In the electric circuit which includes the wiper 152, an electromagnet 154 is disposed, and when this magnet is energized, a cam shoe 155 mounted upon an arm 156 pivoted at 157 and carrying the armature 158 of the magnet is moved from the dotted line position shown in Fig. 19 in which it is normally held by the spring 159 into the full line position shown in that figure where it is disposed in the path of a radially slidable pin 161 slidably mounted in a revolving drum 162.

Referring to Fig. 13, it will be observed that the drum 162 is rotatably mounted upon a stationary sleeve 163 carried by the standard 2 and is connected by pins 164 with a cylindrical member 165 fixed to rotate with the hollow shaft 166 carrying and driven by the gear 167 which in turn meshes with and is driven by the pinion 56 similarly to the gear 55. A sleeve 168 keyed to the inner end of shaft 166 carries the delivery turret 153 into which the can bodies are dropped from the carrier wheel when the suction chuck head is released in the manner previously explained. The relative location of the shaft 166 and associated parts with relation to the carrier is illustrated in Fig. 14, as well as in Fig. 4.

Referring now to Figs. 13 et seq., the pins 161 carried by the disc 162 are moved into their outermost position as the disc rotates in a counterclockwise direction, viewing Figs. 17 and 18, by a stationary cam 169 surrounding the hub 171 and held against rotation with the disc by an arm or bracket 172 surrounding the hub, attached at one end by bolts 173 to an arm 174 extending from the stationary bearing 175, carrying at its other end the electromagnet 154 and attached to the cam 169 by one or more pins or screws 176. At each revolution of the drum 162, all of the pins are moved into their retracted position by the high portion of the cam 169 and remain in this idle inoperative position unless they are projected inwardly by the cam shoe 155, under the influence of the electromagnet 154 which takes place only in the event of energization of the electromagnet as the result of a leaky can body, as previously explained. The pins 161 are frictionally held against accidental movement by small friction plungers 177, one for each pin, urged into frictional engagement with their respective pins by coiled expansion springs 178. The plungers and springs are disposed in sockets formed in the disc 162 and are held therein by an annular retaining plate 179 secured by screws or other fastening means to the face of the disc.

A roller 181 as shown in Figs. 16, 18 and 19 is mounted upon the lower end of a stub shaft 182 clamped in the head 183 of an arm 184 pivoted at 185 upon a bracket 186 secured to the stationary arm 174 and is normally urged into the path of an inwardly projecting pin 161 by a coiled expansion spring 187 surrounding a laterally projecting rod 188', the tension on this spring being regulated by adjusting the lock nuts 189 (Fig. 16). When one of the pins 161 is projected inwardly as shown in Figs. 18 and 19, the engagement of this pin upon rotation of the drum 162 with the roller 181 will force said roller outwardly or to the right, viewing Fig. 23, against the projecting head 186' of a valve stem 187' carried by the drum 165 in alignment longitudinally of the shaft 166 with the pin 161. It may be stated at this point that the number of pins 161 and valve stems 187' correspond with the number of can receiving sockets 188 in the delivery turret head 153 and they all rotate together.

Referring now more particularly to Fig. 13, it will be observed that each valve stem 187' carries a valve 191 normally held against a seat 192 formed in the outer face of the drum 165 by a coiled expansion spring 193 interposed between the outer face of the valve and an opposed face of a flange 194 carried by the sleeve 168 and secured to the drum 165 by a plurality of bolts 195. Each valve 191 is adapted to move in a chamber 196 which communicates through a longitudinal bore 197 in the sleeve 168 with a radial port 198 opening into a suction cup 199 of rubber or similar material mounted in the bottom of a socket of the delivery turret and adapted, when suction or partial vacuum is applied through the port 198 to the opposed curved perimeter of a can body, to hold said body by suction to the turret head so as to prevent it from dropping out therefrom.

The vacuum is applied to the inner face of the valves 191 when the valves are closed, and to the suction cups 199 when the valves are open from the vacuum pump previously mentioned, by means of a vacuum pipe 201 from which enters a chamber 202 formed in the sleeve 163 around the hollow shaft 166. A plurality of ports 203 through the shaft 166 admit this vacuum to the interior of the shaft from which it is applied through ports 204 to an annular passage 205 (Figs. 13 and 20) in the drum 165. From this annular passage, the vacuum is applied to the inner face of the valves 191 through radial ports 206 communicating with annular valve chambers 207.

When a valve 191 is moved to open position by the roller 181, as previously explained, the valve is retained in this open position by a latch 208 pivotally mounted upon the outer end of the drum 165 by a pivot bolt 209, the inner end of the latch being urged radially inwardly by a spring 211 attached at one end to the tail of the latch and at its other end to a non-rotatable washer 210 (Fig. 21). Movement of the valve to open position permits the inner end of the latch to drop inwardly behind a shoulder 212 formed on the valve stem whereby the valve is maintained in open position until by revolution of the drum 163 the tail of said latch is brought into engagement with a stationary trip pin 213 which releases the latch and permits the valve to close. The closing of the valve not only shuts off the application of vacuum to its respective suction cup 199, but also establishes communication between this cup and atmosphere through the stem of the valve 191. Referring to Fig. 13, it will be observed that the stem 187' of each valve is provided with a longitudinal passage 214 communicating through radial ports 215 with an air port 216 opening to atmosphere. When a valve therefore moves to closed position, the previously established vacuum upon its suction cup is relieved through the passage 214 and the ports 215 and 216. The valve stem 187' also serves as a shut-off by closing the inner end of air port 216 when the valve is moved to open position.

When non-leaky bodies are being tested, there will be no pressure reduction in the testing chamber 123, consequently no deflection of the diaphragm 141 and no closure of the electric circuit including the wiper 152, the pin control cam 155 will remain in its inoperative position, shown in dotted lines in Fig. 19, no pin 161 will contact the roller 181, no valve 191 will be opened, and consequently no suction will be applied to any cup 199.

When, however, a leaky can body results in a drop in pressure in the testing chamber 123 and consequently in the connected chamber 142, the diaphragm will flex so as to make electrical contact with the contact pin 145, whereupon as the contact post 147 is moved across the stationary wiper 152, the electric circuit, including the electric magnet 154 will be energized to move the pin control cam 155 into the operative position shown in full lines in Fig. 19, whereby the next pin 161 contacting the cam will be moved radially inwardly to deflect the roller 181 and open a corresponding valve 191. It should be noted at this point that the wiper 152 is only in momentary contact with the post 147 and as soon as the contact is broken by movement of the post away from the wiper the pin control cam 155 will resume its normal inoperative position under the influence of the spring 159. Only one of the pins 161 will therefore be projected inwardly at each closure of the electric circuit. The closure of the electric circuit therefore causes a partial vacuum to be applied to that suction cup 199 which, as the result of the timing of the machine, is brought into position to receive from the carrier that body in which the leak was detected. The manner in which the leaky cans are separated from the good cans and independently delivered from the machine will now be explained.

Referring particularly to Figs. 3, 4, 5, and 7, it will be observed that each can body is withdrawn from its testing receptacle 61 by a semi-revolution of its pinion 75 induced by the rack 77 as shown in Fig. 3. While the rack 77 has been shown in this figure, this showing is merely illustrative of the function of the rack, as it will be manifest from Fig. 11 particularly that a vertical sectional view does not in reality intersect the rack. This retraction of the can bodies from their testing receptacles takes place just before the bodies are successively brought into registration with the sockets of the delivery turret head 153. At about the time each can enters a socket 188 of this head, the vacuum on that chuck head 62 is broken through the air port 106, as previously explained, and the body settles into the socket and is supported upon the vacuum cup 199. If no vacuum be applied to this cup, the can is carried around and drops by gravity into the lower good can delivery chute 217. If a leaky body, however, is deposited in the socket, vacuum is applied to that suction cup 199 in the manner previously explained, and this suction will retain the body in the socket so that it will not drop out by gravity into the chute 217 with the good bodies, but will be carried around by the head until it is released therefrom by a pair of curved stripper fingers 218 by which it will be caused to drop into the upper delivery chute 219 which, as shown in Fig. 5, is turned laterally to deliver the defective bodies to a separate destination from the good bodies. Practically simultaneously with the stripping of the body from the delivery turret head the vacuum on the suction cup 199 is relieved by the closure of the valve 191 as the result of the engagement of the tail of the controlling latch 208 with the stationary release pin 213. It will be apparent from the foregoing that the leaky bodies are automatically selected and delivered from the machine separately from the good bodies, while the machine is in continuous operation at a very high speed, this machine being adapted to test bodies at the rate of three hundred per minute.

In order that the feed turret head 53 may be angularly adjusted to dispose the feed pockets in proper timed relation with respect to the chuck heads by which the can bodies are removed from the turret, the gear 55 which drives the shaft 54 is angularly adjustable relatively to the shaft. Viewing Fig. 22, it will be observed that a hub 221 is keyed to the shaft 54 and the gear 55 which slips over this hub is provided with an annular ring 222 having arcuate slots or a plurality of arcuately arranged holes to receive the bolts 223 by which the ring and consequently the gear is secured to the hub in adjusted position. The gear 167 which drives the delivery turret head may be similarly adjustably mounted upon its shaft 166.

The construction of the machine having been described in detail, a brief statement of the cycle of operations follows:

The can bodies roll by gravity to the lower end of the feed chute 51 where they are picked up by the feed delivery turret 53 and carried into alignment with the successive chuck heads 62 which are in retracted position, as shown in Fig. 3. The stationary cam 112 moves each body longitudinally into engagement with the chuck head to which it becomes attached, by reason of the partial vacuum exerted through the center of the chuck head.

The bodies are carried by their respective chuck heads upwardly away from the feed turret and are then introduced in pairs into their respective aligned testing receptacles 61. When the bodies have been positioned within their respective receptacles, air pressure is applied to the exterior of each body in the testing chamber 123, which is of relatively small volume, so that a slight leak in the body will produce a material pressure reduction in a relatively short time. Should no leak be detected in a body, it will be carried around by the carrier, withdrawn from its testing receptacle by the chuck head (the bodies are withdrawn in pairs as well as being inserted into their receptacles in pairs) deposited in a socket of the delivery turret, and finally discharged through the good can delivery chute 217.

Should, however, a leak be present in a body, the resultant pressure reduction in the surrounding testing chamber will, by deflection of the diaphragm 141, close an electric circuit which, through the cam 155, will project a corresponding pin 161 inwardly so that it will engage and actuate the roller 181 to thereby open the corresponding vacuum valve 191 which permits the application of suction to the suction cup 199 in that socket of the delivery turret in which the leaky can is deposited from the carrier. This suction of the cup 199 will hold the leaky body to the turret so that it will be carried upwardly above the good can chute 217 and will be stripped from the turret by the fingers 218 and delivered by the leaky can chute to a destination separate from the good bodies.

The leaky bodies are therefore automatically and accurately selected during their travel with the carrier and are automatically separated from the good bodies so that no manual operation whatsoever is required during the testing operation. The machine is accurate and reliable and operates at extremely high speeds, so that the cost of testing is reduced to a minimum.

While I have shown and described a preferred embodiment of my invention, obviously the structural retails illustrated and described are capable of wide modification and variation without departing from the essence of the invention as defined in the following claims.

I claim:

1. In a can body testing machine the combination of a carrier, a series of testing receptacles carried thereby, a reciprocatory chuck head aligned with each receptacle, means for applying suction to each chuck head, means for moving can bodies successively into contact with said chuck head to which they are adapted to become attached by said suction, means for actuating said chuck heads in pairs to simultaneously introduce a plurality of said bodies into their respective receptacles, each chuck head serving to seal its cooperating receptacle whereby a testing chamber surrounding each can body is produced, means for producing a pressure in each testing chamber for a short interval and for thereafter cutting off said pressure, means actuated by a reduction in pressure in said chamber resulting from a leak in a body for detecting such leaks, and means controlled by said last mentioned means for separating the leaky bodies from and delivering the same independently of the good bodies.

2. In a can body testing machine, the combination of a carrier, a series of testing receptacles carried thereby, means for positioning can bodies to be tested in said receptacles, means for imposing a pressure in each receptacle around the body therein, leak detecting means including an electric circuit and a diaphragm subjected to the receptacle pressure and adapted to be actuated upon reduction of pressure in any receptacle to close said electric circuit, a delivery turret head provided with pockets adapted to receive the can bodies from said carrier, and means controlled by said electric circuit for causing leaky bodies to be carried by said turret to a point remote from the point of delivery of the good bodies therefrom.

3. In a can body testing machine, the combination of a carrier provided with a series of testing receptacles for the reception of can bodies to be tested, means on the carrier for detecting leaky bodies in said receptacles, a delivery turret provided with pockets adapted to receive the can bodies from said carrier, means controlled by said detecting means for causing said leaky bodies to adhere to said turret while the good bodies are discharged therefrom, and means for removing said leaky bodies from the turret and causing them to be delivered separately from the good bodies.

4. In a can body testing machine, the combination of a rotatable carrier, a series of testing receptacles mounted thereon, a chuck head in alignment with each receptacle and reciprocable toward and from its receptacle, means for positioning the can bodies in alignment with the respective receptacles, means for moving each of said bodies longitudinally into engagement with its aligned chuck head, means for imposing a partial vacuum upon the interior of each body through its chuck head, means for reciprocating said chuck heads to introduce the can bodies into and withdraw the same from said receptacles at predetermined points in the travel of the carrier, means for imposing a pressure in each receptacle around the can body therein, means controlled by said pressure for detecting leaky cans in said receptacles, a delivery turret provided with pockets adapted to receive the can bodies from said carrier, means for relieving the vacuum on said bodies to permit their deposit in said turret, and means controlled by said detecting means for causing the delivery of the leaky bodies separately from the good bodies.

5. In a can body testing machine, the combination of a carrier, means for supporting a plurality of can bodies on said carrier, means for applying a negative pressure to the interior of each body, means for applying a positive pressure to the exterior of each body, an electric circuit, means actuated by a reduction in pressure around any body resulting from a leak in said body for closing said circuit and pneumatic means controlled by the circuit including said contact for causing the leaky cans to be delivered from the machines separately from the good cans.

6. In a can body testing machine, the combination of a rotatable carrier provided with can body testing receptacles, means for feeding the can bodies into alignment with said receptacles, a chuck head for closing each receptacle, means for moving the aligned can bodies into engagement with their respective chuck heads, means for applying a partial vacuum through each chuck head upon its engaged can body, means for moving said chuck heads in pairs to simultaneously introduce the bodies carried thereby into their respective receptacles, means for applying a pressure to the interior of each receptacle around the can body therein, means for holding said pressure during a partial revolution of the carrier, means including a pair of pressure chambers and an interposed flexible diaphragm for detecting a leak in any of said bodies, means for actuating said chuck heads in pairs to simultaneously withdraw a plurality of said bodies from their receptacles, a revolving turret provided with pockets adapted to receive the withdrawn bodies, pneumatic means associated with said turret for holding can bodies to said turret, means actuated by said detecting means for controlling said pneumatic means so as to cause the delivery of leaky and good can bodies separately from the machine.

7. In a can body testing machine, a wheel provided with a plurality of testing receptatcles, means for inserting a plurality of can bodies simultaneously into a plurality of said receptacles, means for testing said bodies for leaks while in said receptacles, means for withdrawing the can bodies a plurality at a time from the receptacles, and means for thereafter segregating leaky and non-leaky bodies one at a time successively.

8. In a can body testing machine, a testing receptacle having a volume only very slightly larger than the can body to be tested therein, means for pneumatically gripping and inserting a can body into said receptacle and for sealing both with the can surrounded at its sides by air only, means for inducing a pressure other than atmospheric within said can body and means for temporarily confining during testing of the can body the air which contacts with the outside of the can body within the receptacle, and means actuated by a change in pressure of said confined air during said testing for detecting leaky can bodies.

9. A can body testing machine including a testing receptacle having a body only slightly larger than that of the can body to be tested therein, means including a resiliently surfaced apertured plate for gripping a can body by suction and introducing its closed end first into said receptacle, means for sealing the open end of the can and the open end of the receptacle, a resiliently mounted member in the closed end of the receptacle for yieldingly holding the can body against said plate, means for producing a pressure differential between the interior of the can body and the space in the receptacle surrounding it, and means controlled by a variation in said pressure differential for detecting a leak in said body.

10. A can body testing machine including a testing receptacle, means including a resiliently surfaced apertured plate for gripping by suction a can body by its open end and inserting it into said receptacle and for sealing said receptacle after insertion of the can body, means in the inner end of the receptacle for resiliently urging the can body against said plate, means for producing a pressure differential between the can body interior and the space in the receptacle surrounding it, and means controlled by a variation in said pressure differential for detecting a leak in said body.

11. A can body testing machine including a testing receptacle, means including a resiliently surfaced apertured plate for gripping by suction a can body by its open end and inserting it into said receptacle and for sealing said receptacle after insertion of the can body, a resiliently mounted member at the inner end of said receptacle for urging said can body against said plate and an air conduit controlling valve actuated by compression of said member, means operative upon the opening of said valve for producing a pressure differential between the testing chamber surrounding the body and the interior of said body, and means controlled by a variation in said pressure differential for detecting a leak in said body.

12. A can body testing machine comprising a testing wheel mounted on a horizontal axis, and having a plurality of horizontally extending dry testing receptacles, means for delivering can bodies horizontally disposed into proximity with said wheel, means including a resiliently surfaced plate for gripping the open ends of the can bodies by suction and inserting them into said receptacles and for sealing the receptacles after said insertion, means for urging said can bodies against their respective plates, means for producing a pressure differential between the interior of each said can bodies and the space in the receptacle surrounding it, and means controlled by a variation in said pressure differential for detecting a leak in said body.

13. A can body testing machine comprising a testing wheel carrying a plurality of testing receptacles, a reciprocatory hollow tube and means for reciprocating it, a chuck head carried by said tube having a resiliently surfaced apertured face, means for applying suction through said tube and head and through the aperture in said face to grip the open end of can bodies by suction for inserting them into said receptacles, said face serving to seal the open end of the receptacle, means for producing a pressure differential between the interior of said can body and the space surrounding it in said receptacle, and means actuated by variation in said differential for detecting a leak in a can body.

14. In a can testing machine, a rotatable testing wheel provided with a plurality of testing receptacles, means for inserting the cans into and withdrawing them from said receptacles including resiliently surfaced plates adapted to abut the open ends of the cans and having apertures therethrough, means for reciprocating said plates toward and from the receptacles, and means for exerting suction on the can interiors through said apertures at certain positions of said wheel during said insertion or withdrawal of the cans.

15. In a can testing machine, a rotatable testing wheel carrying a plurality of receptacles, means mounted for reciprocatory movement on said wheel for gripping the open ends of cans by suction and inserting them into and withdrawing them from said receptacles, the last said means including hollow slidable tubes connected to and supporting resiliently surfaced apertured plates, means for exerting suction through said tubes and apertures to the face of said plate during insertion and withdrawal of said cans, and means actuated in accordance with rotative positions of said wheel for selectively initiating and cutting off the suction at said apertures.

16. A can body testing machine comprising means for carrying a plurality of can bodies to be tested, means for detecting leaky bodies and means for separating the leaky bodies from the good bodies, including a rotary element equipped with suction devices movable in succession into cooperative relation with successive bodies delivered from said detecting means and means for controlling the application of suction to said devices in accordance with the determinations of said detecting means.

17. A can body testing machine comprising a carrier upon which the bodies are tested, means for detecting leaky bodies and means for delivering the tested bodies from the carrier, including means controlled by said detecting means for applying suction to the leaky bodies only whereby the leaky bodies are separated from the good bodies.

18. A can body testing machine including a testing receptacle having an interior only slightly larger than that of the can body to be tested therein, means for introducing a body to be tested into said receptacle, means for sealing the open end of said body and the open end of said receptacle, means for producing a pressure differential between the interior of the can body and the space in the receptacle surrounding said body, means controlled by a variation in pressure in said receptacle for detecting a leak in said body and separating means including body receiving sockets provided with suction cups controlled by said leak detecting means for effecting a separation between the good and leaky bodies by applying suction to the bodies of one class only.

19. A can body testing machine comprising a testing chamber only slightly larger than the can body to be tested therein, means including a suction head for inserting a can body into said chamber closed end first and sealing it therein including means for gripping the can body by suction prior to insertion and maintaining the suction thereon after insertion, leak detecting mechanism responsive to pressure changes in the sealed space in the chamber surrounding said body, and means for actuating said head to effect the insertion and withdrawal of can bodies into and from said chamber.

20. In a can body testing machine, a movable carrier and a plurality of testing receptacles thereon only slightly larger than the can bodies to be tested therein, means for sealing the receptacles and can bodies positioned therein, means for introducing air under pressure into the receptacles around the can bodies, means for producing a partial vacuum within the bodies, leak detecting mechanism arranged for connection to said receptacle interiors to be operated by a variation in the receptacle internal pressure caused by leakage of the compressed air through leaky can bodies, and means controlled by said leak detecting mechanism for separating the leaky from the good can bodies by suction.

21. In a can body testing machine, a plurality of testing receptacles, means including a movable suction head for gripping can bodies, and means for moving said head to insert cans into said receptacles and for withdrawing them therefrom after a test, said suction head means continuing the suction on the bodies during testing.

22. In a can body testing machine, a plurality of testing receptacles, a suction head aligned with each receptacle, means for applying suction through said heads to the interiors of can bodies contiguous thereto, and means for actuating said heads to position the bodies within the receptacles and to withdraw them therefrom, the suction application to the bodies being continuous from prior to their introduction into the receptacles to subsequently to their removal therefrom.

23. In a can body testing machine, a plurality of testing receptacles, a suction head for each receptacle, means for moving said heads toward and from their respective receptacles, and means for applying suction through said heads to the interiors of contiguous can bodies whereby said bodies are attached to the heads for introduction into and removal from said receptacles by the heads.

24. In a can body testing machine, a revolving wheel provided with a plurality of testing receptacles, means for delivering can bodies into proximity to said wheel, a movable suction head aligned with each receptacle for gripping the can bodies successively by suction, and means for moving said heads to effect the simultaneous insertion of a plurality of can bodies into their respective receptacles.

25. In a can body testing machine adapted to test a plurality of can bodies simultaneously, means for detecting leaky bodies, a discharge chute for good can bodies, a separate chute for leaky bodies, and means controlled by said leak detecting means for gripping a surface of each leaky can body only by suction to effect the separation of the leaky can bodies from the good can bodies.

26. In a can body testing machine, a carrier for can bodies to be tested, means for detecting leaky bodies on the carrier, and means for separating the leaky bodies from the good bodies, said separating means including a delivery device into cooperative relation with which the bodies are brought in succession by the carrier, and suction means controlled by said detecting means so as to apply suction to those bodies only on the delivery device designated by said detecting means whereby the designated bodies are separated from the undesignated bodies.

27. In a can body testing machine, the combination of means for detecting leaky bodies, a delivery device provided with body receiving sockets, a suction cup associated with each socket, and means controlled by said leak detecting means for applying suction to those sockets only designated by the detecting means whereby the leaky bodies are separated from the good bodies.

28. In a can body testing machine, the combination of means for detecting leaky bodies, separate discharge chutes for good and leaky bodies respectively, suction cups into cooperative relation with which the tested bodies are delivered in succession, and means controlled by said leak detecting means for applying suction to those cups only designated by the detecting means, whereby the bodies designated by the detecting means are delivered by the suction cups into one of said chutes and the remaining bodies uninfluenced by suction are delivered into the other chute.

29. In a can body testing machine, a plurality of testing receptacles, a reciprocable sealing head for each receptacle, means for producing through each head a suction upon the interior of a contiguous can, means for moving the heads successively into engagement with their respective receptacles to insert a can thereinto and seal the receptacle around the can, and means for moving said heads away from their respective receptacles after the test to withdraw the cans therefrom.

30. In a can testing machine, a series of testing receptacles, a reciprocatory head in alignment with each receptacle, means for presenting the open ends of can bodies to be tested into proximity to said heads, means for applying suction through said heads to the interiors of said bodies whereby the bodies are secured to the heads, mechanism for actuating said heads in predetermined sequence to position the bodies within the receptacles and seal the receptacles and to subsequently withdraw the bodies from the receptacles, means for detecting leaky bodies sealed in said receptacles, a delivery device provided with sockets for the reception of tested bodies, and means controlled by said leak detecting means for separating the good type of bodies from the bad type by holding one type in said sockets and permitting the other type to lie loosely thereon.

WILLIAM CAMERON.

CERTIFICATE OF CORRECTION.

Patent No. 2,013,402. September 3, 1935.

WILLIAM CAMERON.

It is hereby certified that error appears in the printed specification of the above numbered patent requiring correction as follows: Page 2, first column, line 14, for "Sheet 8" read Sheet 7; line 20, for "Sheet 7" read Sheet 6; line 26, for "19–19" read 17–17; line 28, for "20–20" read 18–18; line 30, for "21–21" read 19–19; line 32, for "22–22" read 20–20; line 36, for "Sheet 10" read Sheet 9; and page 7, first column, line 13, for "retails" read details; and that the said Letters Patent should be read with these corrections therein that the same may conform to the record of the case in the Patent Office.

Signed and sealed this 10th day of December, A. D. 1935.

Leslie Frazer (Seal) Acting Commissioner of Patents.